United States Patent
Bishop

[15] 3,693,333
[45] Sept. 26, 1972

[54] LAWN MOWER VERTICAL CUTTER ATTACHMENT

[72] Inventor: Forest M. Bishop, 1217 G. W. Highway # 76, Richland, Wash. 99352

[22] Filed: June 5, 1970

[21] Appl. No.: 43,777

[52] U.S. Cl..............56/16.1, 56/16.9, 56/DIG. 13, 56/251, 56/294
[51] Int. Cl.............................................A01d 57/14
[58] Field of Search.......56/249, 294, 16.1; 146/117, 146/121

[56] References Cited

UNITED STATES PATENTS

| | | |
|---|---|---|
| 3,139,918 | 7/1964 | Grönberg..................146/121 |
| 2,722,795 | 11/1955 | Warner......................56/249 |
| 3,222,854 | 12/1965 | Barth........................56/294 |
| 3,373,548 | 3/1968 | Myers et al................56/294 |

Primary Examiner—Louis G. Mancene
Assistant Examiner—J. Q. Lever
Attorney—Berman, Davidson and Berman

[57] ABSTRACT

An attachment for a power lawn mower consisting of a wheel-supported frame on which is journaled a transverse shaft carrying a plurality of spaced radially extending saw-cutting blades rotating in longitudinal vertical planes. The frame is attached to a lawn mower and the shaft is drivingly connected by a belt and pulley to the lawn mower reel shaft so as to be driven simultaneously therewith.

4 Claims, 6 Drawing Figures

INVENTOR.
FOREST M. BISHOP,
BY
Berman, Davidson & Berman,
ATTORNEYS.

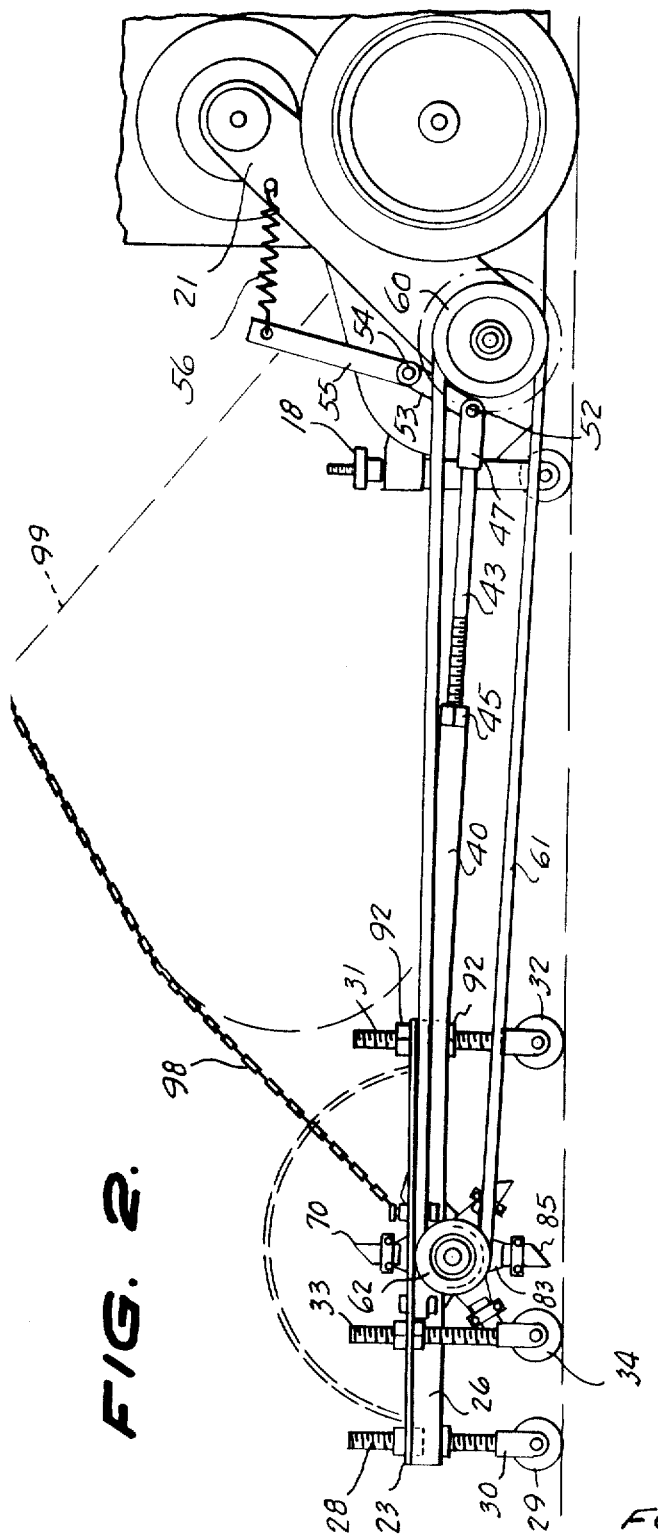
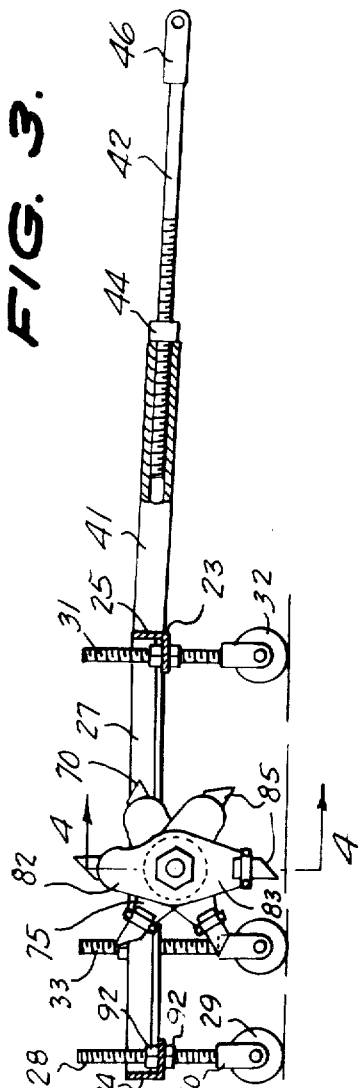
FIG. 2.
FIG. 3.
INVENTOR.
FOREST M. BISHOP,
BY
Berman, Davidson & Berman,
ATTORNEYS.

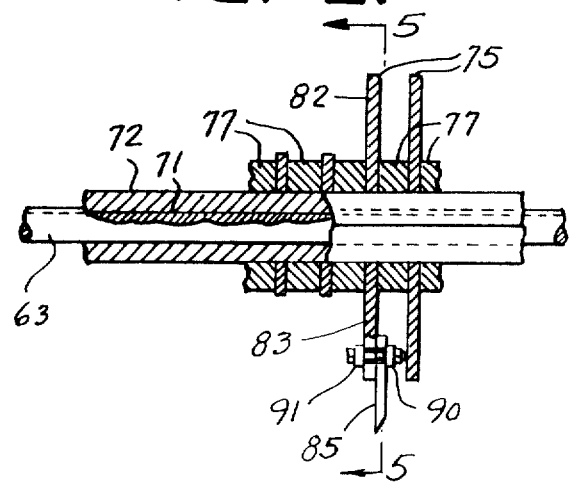
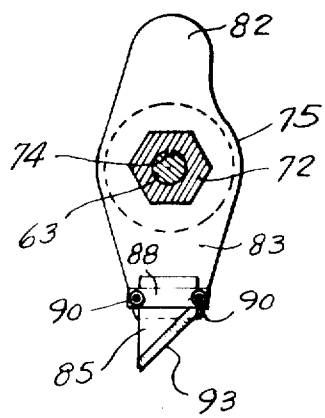
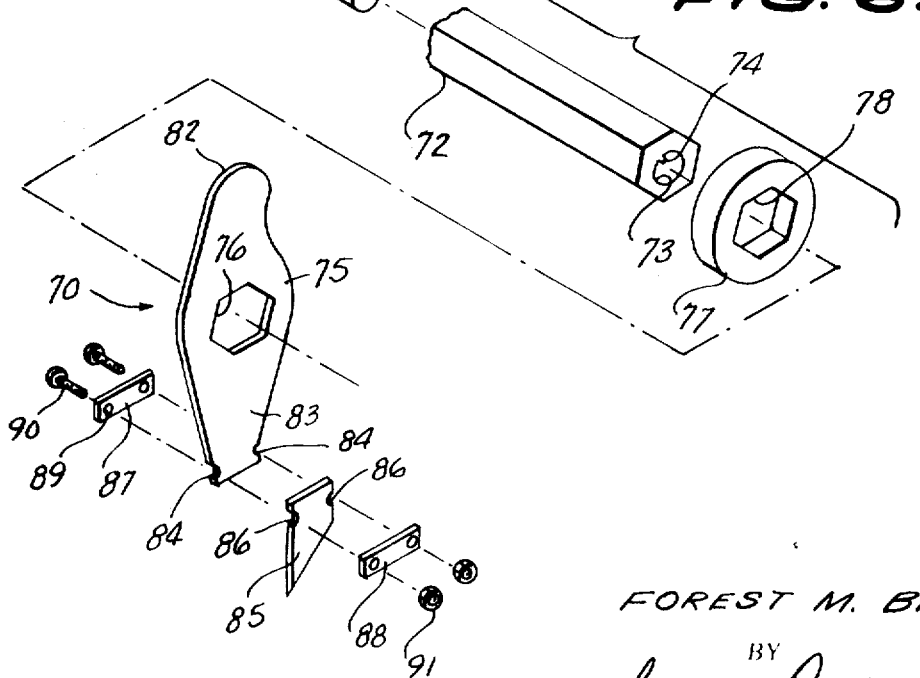
INVENTOR.
FOREST M. BISHOP,
BY
Berman, Davidson & Berman,
ATTORNEYS.

3,693,333

LAWN MOWER VERTICAL CUTTER ATTACHMENT

This invention relates to power lawn mowers, and more particularly to a lawn mower provided with an attachment which has a vertical cutting action for loosening thatched turf simultaneously with the normal horizontal cutting action of the associated lawn mower.

A main object of the invention is to provide a novel and improved vertical cutting attachment for a power lawn mower, the attachment being simple in construction, being easy to attach to a conventional lawn mower, and providing a vertical cutting action which greatly improves the results obtained in mowing a lawn.

A further object of the invention is to provide an improved power lawn mower assembly wherein a combination of vertical and horizontal cutting action is obtained, the vertical cutting portion of the lawn mower being in the form of an attachment for a conventional power lawn mower, the attachment involving inexpensive components, being easy to install, and being driven from the same power source as the main grass-cutting element of the lawn mower.

A still further object of the invention is to provide an improved vertical cutter attachment for use with a conventional reel-type lawn mower, the attachment involving inexpensive components, being durable in construction, being completely adjustable, being easy to maintain in operating condition, and providing a reliable vertical cutting action which loosens thatched sod in front of the lawn mower cutting reel as the lawn mower is advanced, and which, therefore, greatly improves the grass-cutting action of the lawn mower.

Further objects and advantages of the invention will become apparent from the following description and claims, and from the accompanying drawings, wherein:

FIG. 2 is a side elevational view of the structure shown in FIG. 1.

FIG. 3 is a longitudinal vertical cross-sectional view taken substantially on the line 3—3 of FIG. 1.

FIG. 4 is an enlarged vertical cross-sectional view taken substantially on the line 4—4 of FIG. 3.

FIG. 5 is a transverse vertical cross-sectional view taken substantially on the line 5—5 of FIG. 4.

FIG. 6 is an exploded perspective view of a portion of the vertical cutter shaft and associated parts, as employed in the vertical cutter attachment of FIGS. 1 to 5, showing one cutter arm and the associated tooth assembly.

Figure 1:
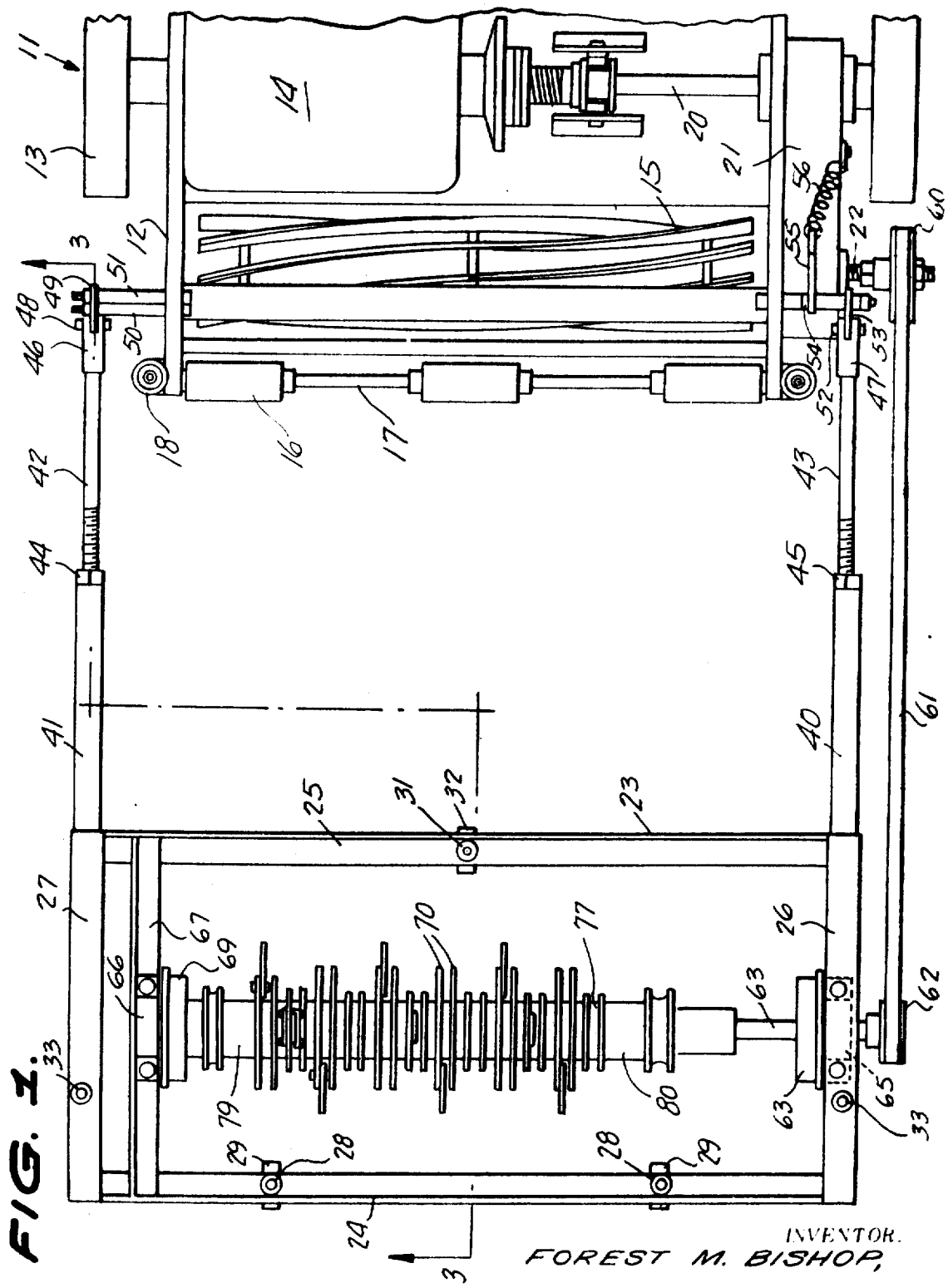
FIG. 1 is a top plan view of the forward portion of a reel-type power lawn mower provided with an improved vertical cutter attachment constructed in accordance with the present invention.

Referring to the drawings, 11 designates a power lawn mower of generally conventional construction having a main supporting frame 12 provided with ground-engaging wheels 13 and provided with a conventional drive motor 14. The frame 12 rotatably supports a cutting reel assembly 15 which extends transversely thereof, and the frame is likewise provided with ground-engaging front supporting rollers 16 which are journaled on a transverse shaft 17 adjustably mounted on the forward end of frame 12. Shaft 17 is vertically adjustable by means of conventional adjusting nuts 18. The reel assembly 15 is driven from the output shaft 20 of motor 14 through suitable reduction gearing in a gear box 21 provided at one side of frame 12, and the reel shaft has an extension 22 which projects laterally from the gear box 21, as shown in FIG. 1.

Designated at 23 is an auxiliary frame, generally rectangular in shape and which comprises transverse angle bars 24 and 25 and longitudinal opposite end bars 26 and 27. The frame 23 is provided with depending threaded caster bolts 28,28 adjustably-secured to the front transverse angle bar 24, the caster bolts being provided at their bottom ends with ground-engaging caster wheels 29 journaled in yoke elements 30, as shown in FIGS. 2 and 3. As shown in FIG. 1, the caster bolts 28,28 are symmetrically located on opposite sides of the longitudinal vertical center plane of frame 23. A similar caster bolt 31 is adjustably secured to and depends from the transverse angle bar 23 substantially centrally thereof, and is similarly provided with a ground-engaging wheel 32. Similar vertical side caster bolts 33, 33 are adjustably secured to and depend from the side bars 26 and 27, being provided at their bottom ends with ground-engaging wheels 34. Thus, the frame 23 is supported on the ground by the wheels 29, 32 and 34.

Respective internally threaded, longitudinally extending sleeves 40 and 41 are rigidly secured to and extend rearwardly from the rear ends of frame bars 26 and 27. Thus, the sleeves 40 and 41 extend rearwardly from the rear corners of frame 23 in alignment with the respective opposite side bars 26 and 27 of the frame. Respective adjustable rod elements 42 and 43 are threadedly engaged in the sleeves 41 and 40 and are locked thereto in adjusted positions by lock nuts 44 and 45, as shown in FIG. 1. Rod 42 is provided with an apertured head portion 46 and rod 43 is similarly provided at its rear end with an apertured head portion 47. The head portion 46 of rod 42 is pivotally connected at 48 to a bar member 49 rigidly secured to and depending from a pair of post members 50 and 51 secured to one side portion of frame 12, and the head member 47 of rod 43 is pivotally secured at 52 to the lower end of an arm 53 rigidly secured to a transverse shaft 54 journaled to the opposite side portion of frame 12. Rigidly secured to the journaled shaft 54 is an upwardly extending arm 55 whose top end is connected by a biasing spring 56 to a sidewall of the transmission box 21. As above mentioned, the box 21 comprises a conventional speed-reduction transmission between motor shaft 20 and reel shaft 22. This may comprise any conventional type of transmission means, such as a sprocket wheel and pulley system, or the like.

The threaded end portion 22 of the reel shaft has mounted thereon a pulley 60 which is connected by a belt 61 to a pulley 62 secured on the end of a transverse shaft 63 journaled in the auxiliary frame 23. The biasing spring 56 exerts a clockwise biasing force on the lever shaft 44 which urges rod 43 toward the left, as viewed in FIG. 1 and, therefore, exerts tensioning force on the belt 61. Sufficient looseness is provided at the opposite pivotal connection at 48 for frame 23 to allow spring 56 to exert effective tightening action on belt 61.

Shaft 63 is journaled at its end portion thereof adjacent pulley 62 in a bearing assembly 65 secured to and depending from side bar 26. The opposite end of shaft 63 is journaled in a bearing assembly 66 mounted on a longitudinal frame bar 67 rigidly secured to the cross-members 24,25 and spaced inwardly from side frame bar 27, as shown in FIG. 1. Secured on the shaft 63 inwardly adjacent side bar 26 and auxiliary longitudinal bar 67 are respective relatively massive wheels 68 and 69 acting as flywheel elements.

Rigidly secured on the shaft 63 in a manner presently to be described, are a plurality of perpendicularly extending cutter blades, designated generally at 70 which rotate in longitudinal vertical planes responsive to the rotation of the shaft 63 under the torque provided by belt 61. As shown in FIG. 6, the shaft 63 is provided with a longitudinal keyway 71 and secured thereon is a hexagonal sleeve 72 provided with an axial bore 73 including a longitudinal key 74. The shaft 63 is receivable in the bore 73 with the longitudinal key 74 engaged in the keyway 71. Each cutter blade assembly 70 comprises an arm 75 having a hexagonal central aperture 76 adapted to slidably engage on the hexagonal sleeve 72 and retain the arm 75 against rotation on the sleeve. Spacer washers 77 are interposed between the adjacent arms 75, each spacer washer 77 being provided with a hexagonal central aperture 78 non-rotatably receiving the hexagonal sleeve 72. The opposite end portions of the rotary cutter assembly are provided with end bushing members 79 and 80 engaged on the shaft 63 and sleeve 72 and provided with suitable locking means, such as set screws, or the like, for rigidly securing them on the shaft.

Each arm 75 comprises a rounded end portion 82 and an opposite tapering end portion 83 having opposed outwardly facing notches 84,84 in its outer portion. Detachably secured to each end portion 83 is a flat tooth 85 having opposite notches 86,86 registrable with the notches 84,84 when the tooth is disposed against the outer portion of member 83. The tooth 85 is clampingly secured to its associated member 83 by opposing clamping plates 87 and 88 having apertures 89 aligning with the registering notches 84,86 and receiving fastening bolts 90 provided with clamping nuts 91.

As shown in FIG. 6, the teeth 85 are generally triangular in shape and have inclined beveled cutting edges 93. The end portions 82 of the arm 75 are substantially of the same order of length as the toothed opposite portions of the arms, shown at 83.

As shown in FIGS. 2 and 3, the arms 75 are arranged on the hexagonal sleeve 72 in successively angularly spaced positions, namely, are staggered so that they project radially at angles of 30° spacing between adjacent arms.

In operation, as the apparatus is moved forwardly, the vertically rotating cutter assemblies 70 provide a vertical cutting action on the thatched or tangled sod in front of the advancing lawn mower cutter reel 15, whereby the thatched grass is loosened and suitably prepared for efficient cutting by the rotating reel 15. The degree of vertical cutting action provided by the vertically rotating cutter element 70 can be regulated by adjusting the height of the auxiliary frame 73, namely, by adjusting the nuts 92,92 of the vertical wheel-carrying threaded shafts 28, 31, and 33.

The distribution of the supporting wheels 29, 34 and 32 is such as to prevent damage to undulating terrain, such as on golf course greens. The wheels 29, 34 and 32 are relatively small in diameter, enabling them to descend into the turf to a substantial amount, allowing the vertically rotating cutter member 70 to cut into thatched turf, thereby effectively loosening the turf and preventing it from becoming strongly established. Thatched turf will allow the wheels 29, 34 and 32 to sink more deeply therein than turf of a more solid nature, so that the cutting action will be automatically provided when needed in accordance with the resistance to penetration of the supporting wheels 29, 34 and 32.

A chain 98 is attached to each side of the auxiliary frame 23, connected between the frame and a suitably stationary portion of the associated lawn mower assembly, such as the top end portion of the lawn mower grass clipping-receiving container 99, to facilitate lifting the vertical cutter attachment to an elevated inoperative position when desired, for example, when making turns on the area being mowed, or when the lawn mower is in transit and is not being operated.

It will be noted that the cutting teeth 85 may be easily removed and replaced, since to remove one of said teeth, it is merely necessary to unfasten the associated clamping bolts 90. This greatly facilitates the sharpening of the teeth, since said teeth may be easily removed for sharpening and can be then readily replaced.

While a specific embodiment of a power lawn mower system including an attachment for providing vertical cutting action has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a power lawn mower having a wheeled main supporting frame and a main rotary cutter shaft journaled on said frame for driving a main cutter, a sod-cutting attachment comprising an auxiliary wheeled frame, means pivotally connecting said auxiliary frame to said main frame, an auxiliary cutter shaft transversely journaled horizontally in said auxiliary frame, means drivingly coupling said auxiliary shaft to said main shaft, and a plurality of cutter blades perpendicularly and rigidly secured on said auxiliary shaft and having cutting edges located in and rotating in longitudinal vertical planes, wherein said auxiliary shaft is provided with a sleeve of polygonal cross-sectional shape non-rotatably secured thereon, said cutter blades having polygonal apertures fitting on said sleeve, whereby the blades are non-rotatable on the sleeve, wherein the blades comprise arms having polygonal apertures fitting on the sleeve, each having an outwardly projecting flat cutting tooth detachably secured to an end thereof and located in one of said longitudinal vertical planes, wherein said end of the arm has outwardly facing notches in its opposing edges, said tooth having notches in its opposing edges registering with the notches on the arm, a pair of clamping bars with the arm and tooth received therebetween, and respective clamping bolts extending through the clamping bars and received in the registering notches of the arm and tooth, wherein the arms have rounded ends projecting opposite the ends carrying the teeth and being of the same order of length, wherein the exposed portions of said teeth are substantially triangular in shape, and wherein the adjacent arms are arranged on the auxiliary shaft so as to project at different angles in their respective longitudinal vertical planes.

2. The power lawn mower of claim 1, and respective spacer washers on the sleeve between adjacent cutter blades, said washers having polygonal apertures fitting the sleeve.

3. The power lawn mower of claim 2, and wherein the sleeve has a hexagonal cross-sectional shape.

4. The power lawn mower of claim 3, and a flywheel member secured on said auxiliary cutter shaft.

* * * * *